United States Patent [19]

Kaufman et al.

[11] Patent Number: 5,764,772
[45] Date of Patent: Jun. 9, 1998

[54] DIFFERENTIAL WORK FACTOR CRYPTOGRAPHY METHOD AND SYSTEM

[75] Inventors: Charles W. Kaufman, Northborough, Mass.; Stephen M. Matyas, Jr., Poughkeepsie, N.Y.

[73] Assignee: Lotus Development Coporation, Cambridge, Mass.

[21] Appl. No.: 573,110

[22] Filed: Dec. 15, 1995

[51] Int. Cl.[6] ............................ H04K 1/00; H04L 9/00
[52] U.S. Cl. ........................ 380/30; 380/21; 380/49
[58] Field of Search ........................ 380/21, 25, 30, 380/49

[56] References Cited

U.S. PATENT DOCUMENTS

| | | |
|---|---|---|
| 4,326,098 | 4/1982 | Bouricius et al. . |
| 4,405,829 | 9/1983 | Rivest et al. . |
| 4,908,861 | 3/1990 | Brachtl et al. . |
| 5,016,274 | 5/1991 | Micali et al. . |
| 5,081,678 | 1/1992 | Kaufman et al. . |
| 5,224,163 | 6/1993 | Gasser et al. . |
| 5,241,599 | 8/1993 | Bellovin et al. . |
| 5,261,002 | 11/1993 | Perlman et al. . |
| 5,276,737 | 1/1994 | Micali ............... 380/30 |
| 5,315,658 | 5/1994 | Micali . |
| 5,323,464 | 6/1994 | Elander et al. . |
| 5,373,559 | 12/1994 | Kaufman et al. . |
| 5,416,841 | 5/1995 | Merrick . |
| 5,416,842 | 5/1995 | Aziz . |
| 5,418,854 | 5/1995 | Kaufman et al. . |
| 5,420,926 | 5/1995 | Low et al. . |
| 5,420,927 | 5/1995 | Micali . |
| 5,432,852 | 7/1995 | Leighton et al. . |
| 5,434,920 | 7/1995 | Cox et al. . |
| 5,436,972 | 7/1995 | Fischer . |
| 5,440,635 | 8/1995 | Bellovin et al. . |
| 5,463,690 | 10/1995 | Crandall . |
| 5,473,696 | 12/1995 | van Breemen et al. . |
| 5,479,512 | 12/1995 | Weiss . |
| 5,499,296 | 3/1996 | Micali ............... 380/23 |
| 5,535,276 | 7/1996 | Ganesan . |
| 5,557,765 | 9/1996 | Lipner et al. ............... 380/21 |

FOREIGN PATENT DOCUMENTS

| | | |
|---|---|---|
| 0576224 A2 | 12/1993 | European Pat. Off. . |
| 0653695 A2 | 5/1995 | European Pat. Off. . |

OTHER PUBLICATIONS

Commercial Key Escros: Something for Everyone Now and for the Future. Stephen T. Walker, Steven B. Lipner, Carl M. Ellison, Dennis K. Branstad, David M. Balenson, Trusted Information Stystems, Inc., Jan. 3, 1995, pp. 1–14.

(List continued on next page.)

*Primary Examiner*—Stephen C. Buczinski
*Attorney, Agent, or Firm*—Brown Raysman Millstein Felder & Steiner

[57] ABSTRACT

Differential work factor cryptographic method, system, and data structure for reducing but not eliminating the work factor required by an authority to break an encrypted message encrypted with a secret encryption key. The secret key is split into at least two partial keys such that knowledge of a first of the partial keys reduces but does not eliminate the work factor required to break the encrypted message. The first partial key is encrypted using a public key of the authority. The encrypted first partial key is provided with the encrypted message to enable the authority, upon obtaining the message, to decrypt the encrypted first partial key using the authority's private key and to break the message using the first partial key. In preferred embodiments, the first partial key is encrypted with additional information which can be reconstructed by the recipient, such as a hash of the secret encryption key, a hash of the secret key concatenated with a salt, all or part of the salt, and control information. The use of a hash function provides one method of enforcing the partial key system. If a salt is used, the salt is also encrypted with the secret key encrypted using the intended recipient's public key. The invention provides secure communications against attackers while satisfying governmental restrictions on the use, export or import of strong encryption products.

21 Claims, 4 Drawing Sheets

OTHER PUBLICATIONS

Information Security and Privacy in Network Environments, OTA-TCT-606, Chapter 4 (Washington, D.C., U.S. Government Printing Officce, Sep., 1994).

Contemporary Cryptology The Science of Information Integrity, Edited by Gustavus J. Simmons, IEEE Press 1992, pp. 25–36, 48–58, 179–229, 356–373, 379–419, 501–505, 517–521, 552–557.

RSA's Frequently Asked Questions about Today's Cryptography: General, World Wide Web address: http://www.rsa.com/rsalabs/faq/faq_gnrl.html.

RSA's Frequently Asked Questions about Today's Cryptography: Miscellaneous, World Wide Web address: http://www.rsa.com/rsalabs/faq/faq_misc.html.

RSA's Frequently Asked Questions about Today's Cryptography: RSA, World Wide Web address:http://www.rsa.com/rsalabs/faq/faq_rsa.html.

DIFFERENTIAL WORK FACTOR CRYPTOGRAPHY METHOD AND SYSTEM

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

RELATED APPLICATION

A commonly owned U.S. application, attorney docket no. 010296/204, application Ser. No. 08/573,228, filed Dec. 15, 1995, for a "DIFFERENTIAL WORK FACTOR CRYPTOGRAPHY METHOD AND SYSTEM", now pending, is hereby incorporated by reference.

BACKGROUND OF THE INVENTION

This invention relates generally to the field of cryptology and, more particularly, to cryptographic methods and systems which provide for secure communications against attackers but which satisfy restrictions imposed by governmental authorities against the use, export, or import of strong cryptographic systems.

Two general types of cryptography are secret key cryptography and public key cryptography. With secret key, or symmetric, cryptography, a message (also called "plaintext") to be transmitted from a sender to an intended recipient is encrypted using a secret value or key, and the intended recipient decrypts the encrypted message (also called "ciphertext" or "cryptogram") using the same secret key. Only the secret key may be used to encrypt and decrypt the message, and attempts made to decrypt the message with other keys will fail. This system must provide for some secure way for the sender to communicate the secret key to the intended recipient, such as by secure courier. A widely used secret key system is the Data Encryption Standard, or DES, which employs a 56 bit key and 8 non-key parity bits. DES was published as a U.S. Federal Information Processing Standard in 1977.

With public key, or asymmetric, cryptography, a different key is used to encrypt than is used to decrypt, and one key can not be derived from the other. Each entity participating in a public key system has two keys; the key used to encrypt is made public and the key used to decrypt is kept secret. As a result, a sender can transmit a message to an intended recipient by encrypting it with the recipient's public key, and the recipient and only the recipient can decrypt the message using his secret or private key. A central agency is often employed to make the public keys available and to issue certificates certifying the authenticity of keys. One example of a commercially available public key system is the RSA algorithm, described in U.S. Pat. No. 4,405,829 and implemented in software available from RSA Data Security, Inc. of Redwood City, Calif.

A public key system is frequently used to encrypt and transmit secret keys for use with a secret key system. A public key system is also used to provide for digital signatures, in which the sender encrypts a signature message using his private key. Because the signature message can only be decrypted with the sender's public key, the recipient can use the sender's public key to confirm that the signature message originated with the sender.

The degree of security provided by, or strength of, an encryption system is often measured in terms of the number of bits in the key. For example, in a secret key encryption system, a key which is three bytes long (i.e., 24 bits) can be relatively easily broken by trying each of the $2^{24}$ possible keys until the message is decrypted, i.e., until the encryption is broken. This type of attack, wherein keys are guessed and tried until sensible plaintext is obtained, is sometimes referred to as a "brute-force attack" or "exhaustive cryptanalysis." In some public key systems, including RSA, the same value encrypted twice produces the same result. In those systems, an attacker who knows the public key used to encrypt the message can attempt to break the encrypted message by systematically trying various messages, encrypting each one with the public key, and comparing the resulting encrypted data with the encrypted message until a match is found. The strength of public key systems also depends on key size, although the strength of key sizes for different algorithms are not necessarily comparable. With RSA, key sizes on the order of 500–1000 bits are necessary to provide a reasonable level of security against attack.

The average amount of effort or work required to break an encryption system, i.e., to decrypt a message without having the entire encryption key or to find a secret key given all or part of a ciphertext, is sometimes referred to as the work factor or work characteristic of the cryptographic system. This is measured in some convenient units such as hours of computing time on one or more given computer systems or a cost in dollars of breaking the encryption. If the work factor is sufficiently high, the encryption system is considered to be practically or economically unbreakable, and is sometimes referred to as "economically infeasible" to break. Communication systems using encryption schemes which are economically infeasible to break are generally considered secure.

Of course, the work factor required to break a given cryptographic system can vary over time due to advancements in technology, such as improvements in the speed and capacity of computers. For example, while a 40 bit secret key encryption scheme can currently be broken by a fast personal computer in less than a year or by a room full of personal computers in a short amount of time, future advances in computer technology will likely substantially reduce this work factor.

Further background information regarding the issues described above and the state of the art in cryptology can be obtained from many sources, including U.S. Pat. Nos. 4,908,861, 5,261,002, and 5,323,464, and Simmons, Gustavas J., *Contemporary Cryptology: The Science of information Integrity* (IEEE Press 1992), all of which are hereby incorporated herein by reference.

Some governments impose restrictions on the use, export, or import of cryptographic hardware and software having high work factors. For example, citing national security interests, among other reasons, the U.S. prohibits the export of certain types of cryptographic hardware, software, or technical data. The export of these items are controlled by the U.S. Department of State under the Arms Export Control Act (22 U.S.C. §§ 2751–2794) and International Traffic in Arms Regulations (22 C.F.R. §§ 120–130). The State Department can cede jurisdiction over a given cryptographic algorithm or product to the U.S. Department of Commerce, which then controls export of the product under the Export Administration Act (50 U.S.C. §§ 2401–2420) and the Export Administration Regulations.

The export from the U.S. of certain cryptographic algorithms or products having a limited key size has been permitted. For example, the algorithms RC2 and RC4, developed by RSA Data Security, Inc., may currently be exported if limited to a 40 bit key length. As a result, many U.S. companies market two versions of their products—one version with strong cryptography which may be sold in the U.S., and another version, sometimes called the "export", "short key", or "cryptolight" version, to be sold overseas. However, cryptolight systems do not generally provide adequate security against attackers, and the systems are therefore less marketable. The inability of U.S. companies to sell software products with strong cryptography in foreign markets substantially inhibits their ability to compete with foreign companies that do not face the same restrictions on export.

Further background information regarding U.S. export controls and their effect on the software market is available in chapter 4 of U.S. Congress, Office of Technology Assessment, *Information Security and Privacy in Network Environments*, OTA-TCT-606 (Washington, D.C., U.S. Government Printing Office, September, 1994), which is hereby incorporated herein by reference.

In 1994, the Department of Commerce approved the Escrowed Encryption Standard, or EES, as a Federal Information Processing Standard. The EES may be used to encrypt voice, facsimile, and computer data communicated in a telephone system. The EES specifies a symmetric encryption algorithm, called SKIPJACK, which is implemented on a chip, known generally as the "Clipper chip." Each EES chip has a chip-specific key that is split into two parts after being programmed into the chip. Each part of the key is held by one of two designated government escrow agents, and law enforcement agents may obtain the two parts from these escrow agents when surveillance has been authorized, such as via a search warrant. The two parts can then be recombined to form the entire key, which can be used by the government to decrypt a message encrypted with EES without the need for further work.

It was the stated goal of the EES to make it possible to grant easier export approval for strong encryption. However, third-party key escrow systems such as the EES are generally considered undesirable because, among other reasons, of the risk of mistaken disclosure of the key, accidental or otherwise, by the escrow agent or its employees, and of the need to establish international bilateral law enforcement arrangements to address the needs of foreign governments.

Thus, there remains a need for a cryptographic system which provides the advantages of both short key systems, by adequately addressing the government's security interests, and fully escrowed systems, by providing for secure communications against attackers. The present invention substantially solves these problems and provides the heretofore missing cryptographic system.

SUMMARY OF THE INVENTION

It is an object of the present invention to solve the problems described above associated with existing encryption systems.

It is another object of the present invention to provide an encryption system which reduces but does not eliminate the work factor required by one or more authorized entities, such as governmental bodies, to break an encrypted message.

It is another object of the present invention to provide an encryption system which may be legally exported from the U.S. but which provides for secure communication.

It is another object of the present invention to enable U.S. software developers to compete effectively with foreign software developers in the sale of cryptographic software in foreign markets.

It is another object of the present invention to provide for a cryptographic system having a differential work factor without the need for one or more authorities to establish and maintain a large database of keys.

It is another object of the present invention to provide an enforcement method and system for use in a cryptographic system in which all or part of a secret encryption key is encrypted under an authority's public key and transmitted with an encrypted message.

Some or all of the above and other objects of the present invention are achieved by a method for reducing but not eliminating the work factor required by an authorized entity to break an encrypted message, which encrypted message requires a secret encryption key to decrypt the message, and which secret encryption key is provided to or known by an intended recipient of the message other than the authorized entity. The method comprises splitting the secret encryption key into at least two partial keys such that knowledge of a first of the partial keys reduces but does not eliminate the work factor required to break the encrypted message, and providing the authorized entity with information that enables the authorized entity to determine the first partial key and to use the first partial key to break the encrypted message.

In preferred embodiments, the secret key is a random or pseudo-random number (the word "random" being used hereinafter as including either truly random or pseudo-random numbers) generated by an unpredictable random number generator and used to encrypt the message. The secret key is encrypted using a public key of the intended recipient and is provided to the intended recipient together with the encrypted message. The intended recipient can then decrypt the secret key using its secret or private key.

The authorized entity can be given the first partial key by sending it directly to the authorized entity. Alternatively, the first partial key is encrypted using a public key of the authorized entity and attached to the encrypted message, making available to the authorized entity the encrypted first partial key upon obtaining the message, such as by intercepting the message during transmission. The first partial key can be encrypted along with additional information, such as a hash (described furter below) of the secret encryption key, a cryptographic combination, such as a hash, of the secret key concatenated with a salt (described further below), all or part of the salt, and control information. If a salt is used, the salt is also encrypted with the secret key encrypted using the intended recipient's public key.

The use of a hash or other cryptographic combination in the encrypted partial key field provides a method for enforcing the partial key system, because the hash can be calculated by the recipient from the secret key and salt, encrypted with the authorized entity's public key, and compared with the encrypted hash and partial key attached to the encrypted message. The use of the salt helps to control the work factor required by the authorized entity in breaking the message using the hash. An alternative method for enforcing the partial key system is cryptographically combining, such as with a hash function, the entire secret key with the first partial key encrypted with the authorized entity's public key and providing this cryptographic combination with the encrypted message, such as in a header field of the message. The recipient's system can then reproduce the hash using the secret and encrypted partial keys and compare this hashed value with the hashed value received with the encrypted message. If the values do not match, the recipient's system can refuse to decrypt the message.

The authorized entity may be a private trustee holding a partial key in the event the full secret key is lost and must be retrieved, or may be a private or governmental entity holding the partial key to satisfy governmental restriction on use, import, or export of encryption hardware or software using encryption keys greater than a given size. In the latter case, the secret key is split by making the size of the partial key remaining after splitting off the first partial key from the secret encryption key equal to or less than the restricted encryption key size. By creating multiple partial key fields, the system can provide for multiple differential work factors for multiple governments. Of course, a specific license to use, export or import any encryption system should be obtained from each government, and no representation is made herein with respect to any specific government regarding the right to use, export, or import products employing the encryption method and system of the present invention.

The objects of the present invention are also achieved by a differential work factor system for reducing but not eliminating the work factor required by an authorized entity to break an encrypted message, which message is encrypted such that a secret encryption key is required to decrypt the message, and in which a governmental authority imposes one or more restrictions on the use, import, or export of encryption hardware or software using encryption keys greater than a given size.

The system comprises means for splitting the secret encryption key into at least two partial keys such that knowledge of a first of the partial keys reduces but does not eliminate the work factor required to break the encrypted message and such that the size of at least one partial key remaining after splitting off the first partial key from the secret encryption key is no greater than the given size of the encryption key subject to the one or more restrictions of the governmental authority. The system further comprises means for encrypting at least the first partial key using a public key of the authorized entity, and means for providing the encrypted at least first partial key with the encrypted message to enable the authorized entity, in the event the authorized entity obtains the encrypted message and wishes to break it, to decrypt the encrypted at least first partial key using the authorized entity's private key and to break the message using the first partial key.

In preferred embodiments, the system further comprises means for preventing the intended recipient of the encrypted message from decrypting the encrypted message if the encrypted at least first partial key is not provided with the encrypted message or is otherwise determined to have been tampered with. The means preferably comprises the use of the hash of the secret key, possibly with a salt, encrypted under the authorized entity's public key.

The methods and systems of the present invention may be incorporated in software stored on a computer usable medium such as a hard or floppy disk, CD-ROM, or other electrical, magnetic, or optical memory device. The methods or systems may also be incorporated in hardware elements such as specially designed integrated circuits, as is known in the art.

In accordance with further aspects of the present invention, a data structure is provided for an encrypted message stored in a memory device or transmitted from one computer system to another, the data structure providing a reduced work factor for an authorized entity to break the encrypted message. The data structure comprises a first encrypted data entity comprising at least the message encrypted with a secret encryption key and a second encrypted data entity attached to the first encrypted data entity, the second encrypted data entity comprising a partial key of the secret encryption key encrypted using a public key of the authorized entity such that knowledge of the partial key reduces but does not eliminate the work factor required to break the encrypted message. The data structure may also include a third encrypted data entity attached to the encrypted message comprising at least the secret encryption key encrypted with a public key of an intended recipient of the message.

In preferred embodiments, the second encrypted data entity comprises the partial key in combination with a random (i.e., random or pseudo-random) number, a hash of at least part of the secret encryption key, and/or a hash of the secret encryption key and a salt and all or part of the salt. If a salt is used, the third encrypted data entity may comprise the secret encryption key in combination with the salt.

In accordance with further aspects of the present invention, a method is provided for enforcing a differential work factor cryptographic system. In the differential work factor cryptographic system, a message transmitted to an intended recipient other than an authority is encrypted using a secret encryption key, and is transmitted with a partial key of the secret encryption key encrypted using a public key of the authority. The method comprises determining, upon receipt by the intended recipient of the encrypted message, whether the encrypted partial key is provided with the encrypted message and is valid, and refusing to decrypt the encrypted message if the encrypted partial key is not provided with the encrypted message or is not valid. The determination as to the validity of the partial key field may be made by including a hash of the secret key in the partial key field, which hash can be generated again by the recipient, encrypted again with the authority's public key, and compared to the encrypted hash and partial key transmitted with the encrypted message.

Alternatively, the determination as to the validity of the partial key field may be made by including a cryptographic combination, such as a hash, of the secret key combined with the partial key field in the header of the encrypted message, where the recipient recomputes the hash and compares it to the value received in the header.

The enforcement methods described above may also be used in a cryptographic system in which the entire secret encryption key is provided to an authority by encrypting it with the authority's public key and transmitting it with the message. The step of determining whether the encrypted key field is present and valid is the same as the step described above except that the entire key is used rather than a partial key.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Figure 1:
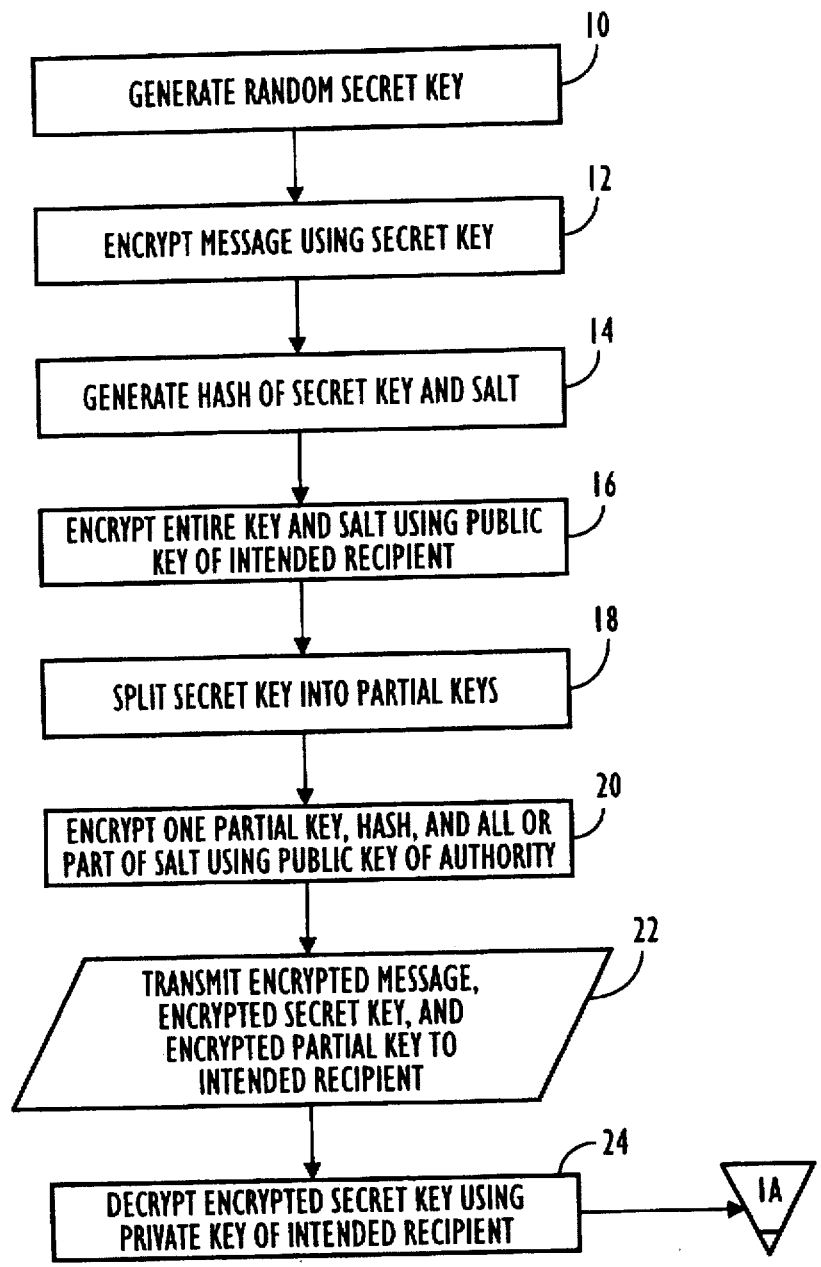
FIGS. 1–1A contain a flow chart showing the process of sending and receiving encrypted messages in accordance with one embodiment of the present invention.
Figure 1A:
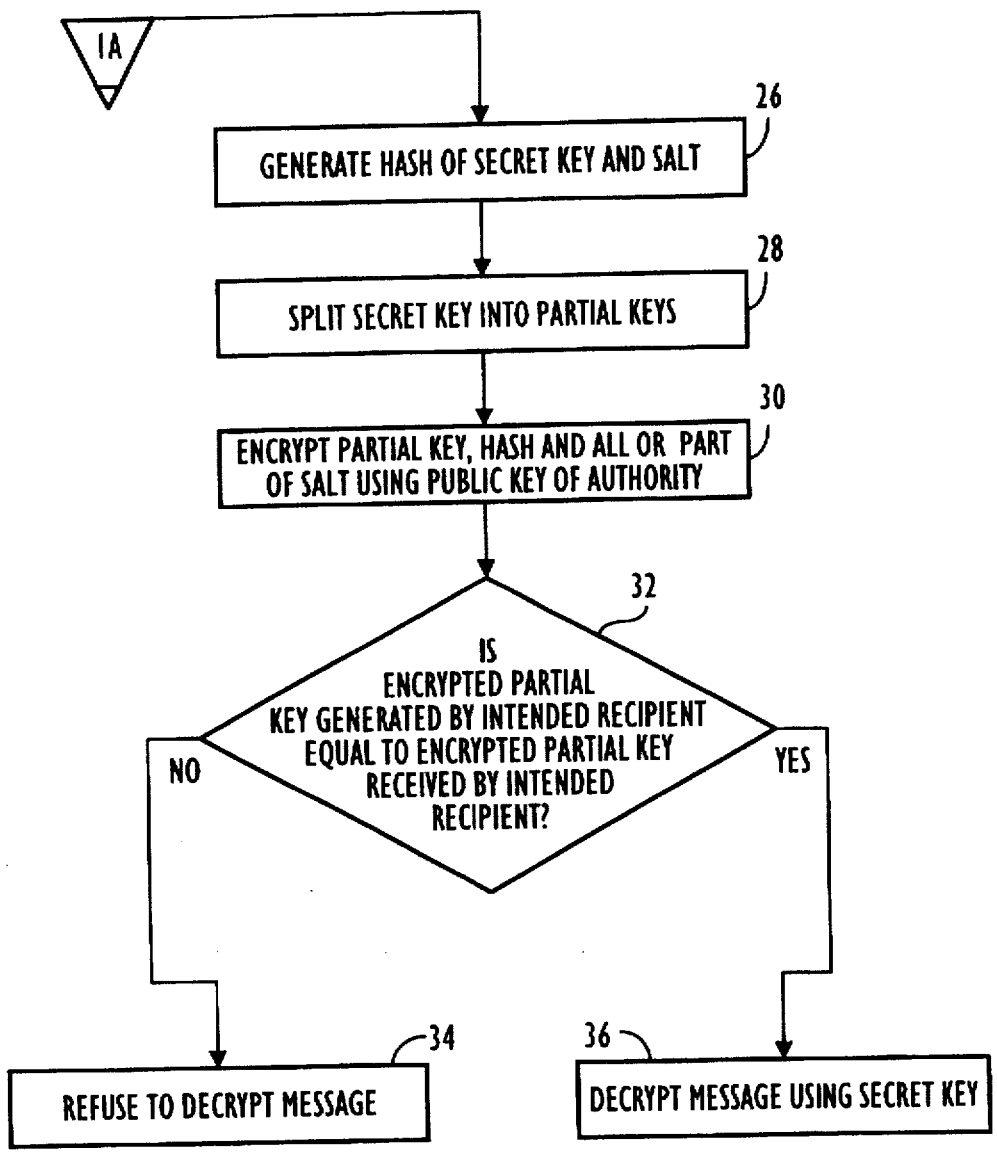

The preferred embodiments of the present invention will be described herein with reference to the flow chart in FIGS. 1–1A and the block diagrams in FIGS. 2–6.

In accordance with the invention, a message to be transmitted is encrypted such that a large secret key is required to decrypt the message. The secret key may be the same key used to encrypt the message or may be the private key of an intended recipient of the message. In the preferred embodiments, with reference to FIGS. 1–1A, the secret key is a random (i.e., random or pseudo-random) number which is generated for each message, step 10, and is used to encrypt the message, step 12. The random key generator preferably generates numbers in an unpredictable manner so that an attacker who breaks one message encrypted with a generated secret key can not guess a subsequent key using the algorithm for the random number generator. The manner of generating an unpredictable series of random numbers is well known in the art and is incorporated in existing encryption systems, such as systems using the RC4 algorithm available from RSA Data Security, Inc., used in the preferred embodiments of the invention.

A sufficiently large secret key is utilized so that the work factor required to break the encrypted message is high and the encrypted message can be considered economically unbreakable. In the preferred embodiments, a secret key size of 64 bits is used. As explained above, the size of the secret key needed to make the communications secure varies depending on the cryptographic algorithm used and the nature of the technology available to break it. Thus, greater key sizes will likely be required in the future to ensure secure communications, and one skilled in the art will recognize the size of the secret key required to ensure secure communications.

To help enforce the differential work factor system in the preferred embodiments, as explained further below, a one-way hash of the secret key is generated, step 14. A one-way hash is a well-known cryptographic function which operates on an input value to produce an output value, called the hash or message digest, and for which it is computationally infeasible to determine the input value from the hash or to find two input values that hash to the same value. Hash functions of various strength are well-known, including the hash functions MD2, MD4, and MD5, available from RSA Data Security, Inc. One skilled in the art will recognize that various hash functions may be used in the present invention.

In further preferred embodiments, the hash function is generated using both the secret key and an additional bit string as input values. The bit string, referred to as a "salt", is a number, preferably randomly generated, which is concatenated with the secret key in order to thwart an attacker who uses a pre-calculated look-up table of possible hash values of keys to determine the secret key. The longer the salt, the stronger the encryption; in the preferred embodiments, the salt is 64 bits in length.

The secret key and salt are encrypted using the public key of the intended recipient, step 16. As explained further below, this encrypted value is decrypted by the recipient, who can then use the secret key to decrypt the encrypted message.

To enable an authorized entity such as a governmental or private trustee authority to break the message when necessary and appropriate (such as when a valid search warrant has been obtained), the secret key is split into at least two partial keys, step 18, and the authority is given a partial key which is just large enough to reduce the work factor sufficiently to make the key economically breakable and to satisfy governmental restrictions against the use, export, or import of encryption technology. In the preferred embodiment, the authority in the U.S. government is given 24 bits of the 64 bits, because the remaining 40 bit partial key is economically breakable and because 40 bit keys are under certain circumstances permitted to be exported from the U.S. If the DES encryption algorithm is used, the partial key given to the authority consists of 16 of the key bits and the 8 non-key bits, so that the partial key kept secret from the authority consists of 40 key bits of the secret key.

The secret key may be split in any convenient manner, such as by splitting off the first or last 24 bits of the 64 bit key. Preferably, the manner in which the key is split is known to both the intended recipient of the message and the authority.

The partial key may be given to the authority in several ways. In one embodiment, the partial key is sent directly to the authority via secure means, such as by encrypting it with a public key of the authority and transmitting it. The authority would then maintain a database of all encrypted partial keys so that each may be accessed when needed to break a message.

In the preferred embodiments, the partial key, hash, and all or part of the salt are encrypted using a public key of the authority, step 20, and this encrypted value is transmitted to the intended recipient along with the encrypted message and the encrypted secret key, step 22. When the authority obtains the message, such as by receiving it from the sender or recipient, copying it from the computer system memory of the sender or recipient, or intercepting it during transmission, it can decrypt the portion of the message encrypted with the authority's public key and thus obtain the partial key, the hash, and all or part of the salt. Using the partial key, the authority can then break the encrypted message using conventional cryptanalytic techniques, such as exhaustive cryptanalysis, or can use exhaustive cryptanalysis to find the secret key, i.e., systematically trying various keys, concatenating each with the salt, when used, hashing each value, and comparing the hashed values with the hash included with the encrypted partial key until a match is obtained.

Because providing the partial key reduces but does not eliminate the work factor required to break the encrypted message, the authority such as a governmental agency is required to expend a not insignificant amount of effort to break each encrypted message which it receives and desires to break. As a result, the authority must be selective in deciding which messages to break, and cannot simply break every encrypted message without the expenditure of massive resources. Individuals are therefore provided a certain level of privacy against governmental intrusion beyond that provided by operation of law.

When the transmitted message is received by the intended recipient, the recipient decrypts the encrypted secret key using its private key, step 24. The recipient then has the secret key with which to decrypt the encrypted message. In the preferred embodiments, the salt is included in the portion encrypted with the recipient's public key, so that the recipient obtains the salt as well.

The hash function and, if used, the salt, are used to enforce the partial key system as follows. After receiving the encrypted message and attached encrypted key fields, the recipient's system concatenates the salt with the secret key and hashes the resulting string, step 26, in the same manner performed by, and using the same hash function used by, the sender. The recipient's system also splits the secret key into at least two partial keys, step 28, in the same manner in which the key was split by the sender. The recipient's system then uses the authority's public key to encrypt the partial key, hash, and all or part of the salt, step 30, and compares this encrypted value with the encrypted partial key received by the recipient, step 32. If the encrypted values do not match, the recipient's system refuses to decrypt the encrypted message with the secret key, step 34. If the encrypted values match, the encrypted message is decrypted using the secret key, step 36.

In this way, the partial key system can be enforced against various abuses, including the sender's deletion of the encrypted partial key field from the message, the sender's improper encryption of the partial key field, such as by using an incorrect public key, so as to prevent the authority from decrypting the field, or the intentional or accidental scrambling of the partial key field during transmission or upon receipt by the recipient.

Figure 2:
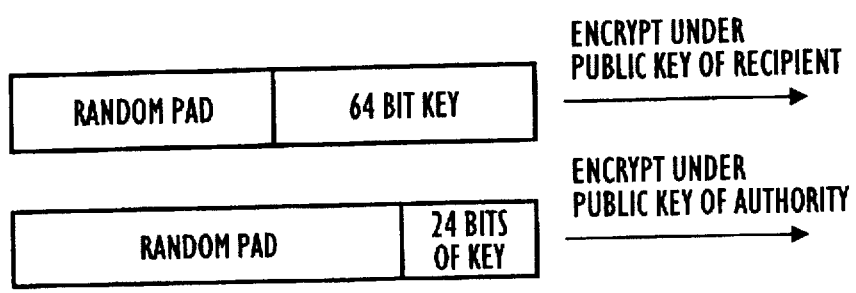
FIGS. 2–6 are block diagrams of data fields encrypted and transmitted in accordance with preferred embodiments of the present invention.

FIGS. 2–6 show various embodiments of data structures with encrypted key fields in accordance with the present invention. FIG. 2 shows a basic embodiment in which the 64 bit secret key is encrypted along with a random number or pad using the public key of the intended recipient. The random pad is combined with the secret key because certain public key systems, such as RSA, require a fixed size block of plaintext to be encrypted depending upon the size of the modulus of the public key of the intended recipient, and the random key provides the additional plaintext to be encrypted. The 24 bit partial key encrypted using the public key of the authority is also concatenated with a random pad for the same reasons, and the random pad should preferably not be calculated using a predictable random number generator which could allow an attacker who determined one of the random pads to determine or accurately guess the other.

Although the embodiment shown in FIG. 2 does not use a hash function or salt as described above, some measure of enforcement of the partial key system may be obtained by using the encryption system of the present invention in a software system having undocumented, proprietary file formats so that the partial key field can not be removed or scrambled. Also, protection against cryptanalytic attacks which can be successful in breaking the encrypted partial key field may be obtained by including random numbers with the partial key to be encrypted so that the attacker would have to guess the random number as well as the partial key in order to break the encrypted message. The recipient ignores these random numbers.

Figure 3:
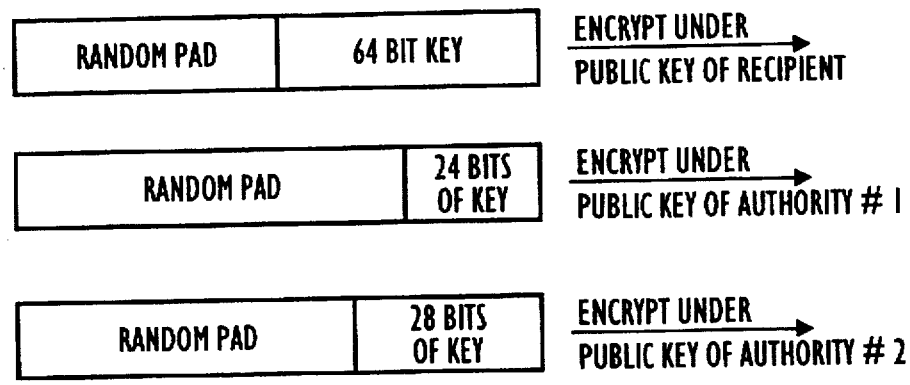

In a typical scenario, at least three governments may want access to a partial key using the present invention—the sender's government, the recipient's government, and the government from which the system using the present invention is exported. The identity of the recipient's authority can be communicated to the sender by including it in the recipient's public key identity certificate. FIG. 3 shows an alternative embodiment suitable for use with two authorities, and one skilled in the art will clearly recognize how to expand the system to any number of authorities. As before, the 64 bit secret key and random pad are encrypted using the intended recipient's public key and the 24 bit partial key and random pad are encrypted using the public key of one authority. If a second authority is to be given the same 24 bit partial key, the partial key and the same or another random pad are encrypted with the public key of that second authority, and that encrypted data entity is also transmitted with the message.

Alternatively, the second authority could impose stricter requirements on permissible key bit sizes, and would then require a larger partial key, for instance, a 28 bit partial key. In that case, as shown in FIG. 3, the secret key is split into two other partial keys of 28 bits and 36 bits, and the second authority is given the 28 bit partial key by encrypting it under the second authority's public key. The partial keys given to the first and second authorities should not be complementary parts of the secret key, so that the governments can not cooperate by combining their partial keys to obtain the entire key. Preferably, the larger partial key contains the entire smaller partial key. As shown in FIG. 3, both encrypted partial keys are attached to and transmitted with the encrypted message. The recipient's system can enforce each partial key system by checking for the presence and validity of each encrypted partial key field, as described above.

As a further alternative, one or more authorities can be given the entire secret key while other authorities are given only partial keys, or all authorities can be given the entire secret key encrypted under different public keys. The amount and type of additional information provided with the encrypted full or partial secret keys can vary among authorities.

A concern with the embodiments described thus far is that they may be circumvented by removing or garbling the encrypted partial key field after the message has been generated so that the recipient will receive the message correctly but the authorized entity will be unable to decrypt it. Such tampering could be resisted by including a hash or other cryptographic combination of the full secret key and the encrypted partial key in a header field of the message. The recipient's system would recompute that hash value using the secret and partial keys and refuse to decrypt the message if the recomputed value did not match the one received with the message. Since only an entity knowing the full key could recompute the hash value, it would be impossible to make an undetected modification to the encrypted key field once the encrypted message was generated.

Figure 4:
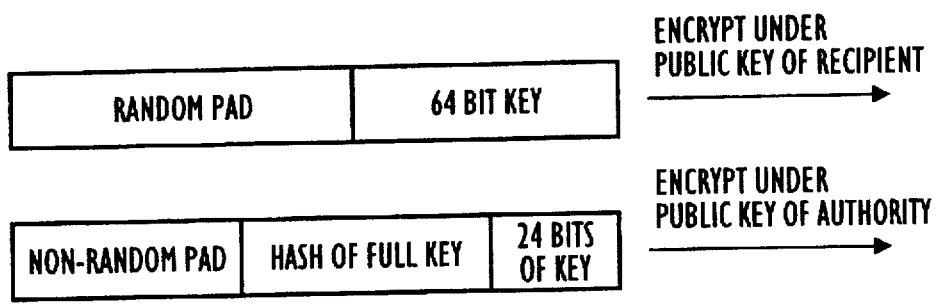
Figure 5:
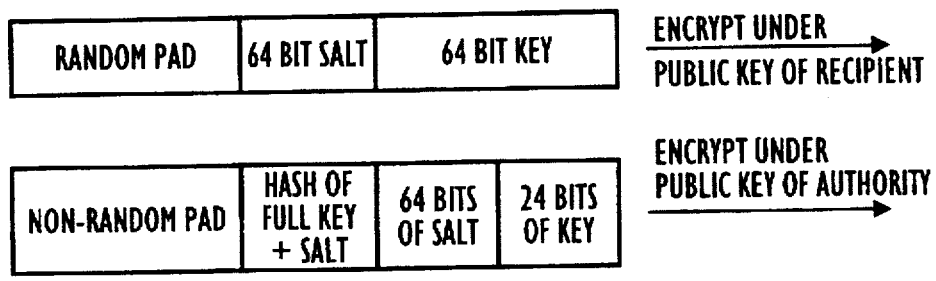
Figure 6:
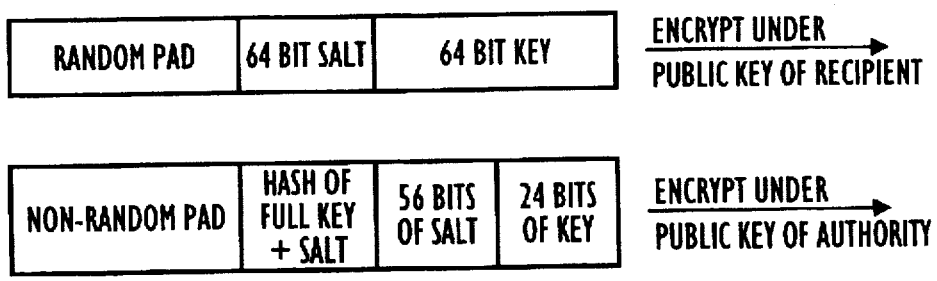

FIGS. 4–6 show message data structures with an even stronger enforcement mechanism, where even if the software generating the encrypted message is modified, it cannot generate a message that the recipient will decrypt correctly but that prevents the authorized entity from obtaining the partial key. In these embodiments, the public key system used is of the type, such as RSA, which generates the same ciphertext for the same plaintext.

In FIG. 4, the 64 bit secret key and random pad are encrypted using the intended recipient's public key, as before, and the 24 bit partial key, a hash of the full secret key, and a non-random pad are concatenated and encrypted under the authority's public key. The sender generates the non-random pad from information being given to the recipient, such as part of the recipient's random pad, so that the recipient will not be required to guess the value of the authority's pad, which would require extra work for the recipient. The recipient's system will enforce the partial key system by, as explained above, decrypting the secret key using the recipient's private key, creating the partial key, generating the hash of the full key, and using the authority's public key to encrypt the partial key, hash, and non-random pad. The recipient's system compares the resulting encrypted entity with the encrypted entity received with the transmitted message, and only allows the message to be decrypted with the secret key if the values match.

Although the message data structure shown in FIG. 4 allows for enforcement of the partial key system, it also provides the authority the ability to use a look-up table of hash values for a given hash function to more easily determine the secret key from the hashed secret key contained in the authority's partial key field. One way to increase the difficulty of computing the table is to perform the hash function multiple times. However, this also increases the processing time for the recipient of the message when checking the validity of the partial key field.

Another way to prevent the authority from using a look-up table of hash values is to concatenate a salt with the secret key, as shown in FIGS. 5 and 6. In both FIGS. 5 and 6, the intended recipient is given the secret key and salt, and is required to calculate the hash using the secret key and salt in order to verify the validity of the partial key field. In FIG. 5, the authority is given the hash and the entire salt, so that the authority is required to calculate a hash for each guess of the full secret key, and can not utilize a hash function look-up table. In FIG. 6, the authority is given only part of the salt, 56 bits out of 64 bits, and must therefore also guess the missing bits of the salt for each hash calculated. This increases the work required by the authority to break the message using the hash to determine the secret key.

As a further alternative, the authority is not given any of the salt, so that the hash cannot be used by the authority to determine the secret key, but can still be used to enforce the partial key system. As one skilled in the art will recognize, many other alternatives to FIGS. 4-6 are of course possible, including hashing only part of the full secret key, with or without salt, providing just the salt with the encrypted partial key, etc., the goal being, as explained herein, to provide additional information encrypted with the partial key which can be reconstructed by the recipient's system and checked to assure that the encrypted partial key field is present and valid.

One skilled in the art will also recognize that by using different variations of the message data structures shown in FIGS. 5 and 6, the differential work factor of the authority required to break a message using the hash can be predetermined and controlled in a precise manner. In contrast, the work factor required to break the message using a brute force attack on the encrypted message varies depending upon the size and contents of the message.

Additional data can be included in the encrypted key fields. For example, the authority's field can include control information such as the identities of the cryptographic algorithm employed in the encryption of the message and the hash function, the date the message was created, identifying information regarding the sender, etc.

The enforcement methods and systems described herein can also be employed in cryptographic systems in which the entire secret encryption key is encrypted under the public key of the authority and transmitted along with the encrypted message. For example, a secret key field can include a hash of the secret key, hashed with or without salt, all or part of the salt, if used, and other information. Alternatively, a hash of the secret key, possibly in combination with other information, can be included in the header field of the encrypted message, as described above.

While the invention has been described and illustrated in connection with preferred embodiments, many variations and modifications as will be evident to those skilled in this art may be made without departing from the spirit and scope of the invention, and the invention as set forth in the appended claims is thus not to be limited to the precise details of methodology or construction set forth above as such variations and modification are intended to be included within the scope of the appended claims.

What is claimed is:

1. A method for reducing but not eliminating the work factor required by an authorized entity to break an encrypted message, which encrypted message requires a secret encryption key to decrypt the message, the method comprising:

splitting the secret encryption key into at least two partial keys such that knowledge of a first of the partial keys reduces but does not eliminate the work factor required to break the encrypted message;

calculating a hash of at least part of the secret encryption key in combination with a salt;

encrypting at least the hash in combination with the first partial key using a public key of the authorized entity; and providing the encrypted first partial key together with the encrypted message thereby enabling the authorized entity to determine the first partial key and to break the encrypted message using the first partial key.

2. The method of claim 1 furter comprising encrypting the message using the secret encryption key, encrypting at least the secret encryption key using a public key of the intended recipient, and providing to the intended recipient such encrypted secret encryption key together with the encrypted message.

3. The method of claim 2 wherein the step of encrypting at least the secret encryption key using the public key of the intended recipient comprises encrypting at least the secret encryption key in combination with the salt using the intended recipient's public key.

4. The method of claim 1 wherein the step of encrypting at least the hash in combination with the first partial key comprises encrypting in combination the hash, the first partial key, and the salt.

5. The method of claim 1 wherein the step of encrypting at least the hash in combination with the first partial key comprises encrypting in combination the hash, the first partial key, and part of the salt.

6. The method of claim 1 wherein the step of encrypting at least the hash in combination with the first partial key using a public key of the authorized entity comprises encrypting control information in combination with the hash and the first partial key.

7. The method of claim 1 wherein a governmental authority imposes one or more restrictions on use, import, or export of encryption hardware or software using encryption keys greater than a given size, and wherein the step of splitting the secret encryption key into at least two partial keys comprises making the size of the at least one partial key remaining after splitting off the first partial key equal to or less than the encryption key size subject to the one or more restrictions of the governmental authority.

8. The method of claim 1 wherein the method reduces but does not eliminate the work factor required by at least one additional authorized entity to break the encrypted message, further comprising providing the at least one additional authorized entity with information that enables the at least one additional authorized entity to determine the first partial key and to break the encrypted message using the first partial key.

9. The method of claim 1 wherein the method reduces but does not eliminate the work factor required by at least one additional authorized entity to break the encrypted message, further comprising:

splitting the secret encryption key into at least two additional partial keys, which additional partial keys are different than the at least two partial keys, such that knowledge of a first of the additional partial keys reduces but does not eliminate the work factor required to break the encrypted message; and providing the at least one additional authorized entity with information that enables the at least one additional authorized entity to determine the first of the additional partial keys and to break the encrypted message using the first of the additional partial keys.

10. The method of claim 1 wherein the step of calculating a hash comprises calculating a hash of the entire secret encryption key in combination with the salt.

11. A data structure for an encrypted message transmitted from one computer system to another, the data structure providing a reduced work factor for an authorized entity to break the encrypted message, the data structure comprising:

a first encrypted data entity comprising the message encrypted with a secret encryption key; and a second encrypted data entity attached to the first encrypted data entity, the second encrypted data entity comprising, in combination, a partial key of the secret encryption key, a hash of at least part of the secret encryption key and a salt, and all or part of the salt, encrypted using a public key of the authorized entity thereby enabling the authorized entity to decrypt the encrypted partial key and to use the partial key to break the encrypted message.

12. The data structure of claim 11 further comprising a third encrypted data entity attached to the first encrypted data entity, the third encrypted data entity comprising at least the secret encryption key encrypted with a public key of an intended recipient of the message.

13. The data structure of claim 12 wherein the third encrypted data entity comprises the secret encryption key in combination with all or part of the salt.

14. The data structure of claim 11 wherein the second encrypted data entity comprises a hash of the entire secret encryption key and the salt.

15. A computer usable medium having computer readable program code means embodied in said medium for causing said computer to perform method steps for reducing but not eliminating the work factor required by an authorized entity to break an encrypted message, which message is encrypted such that a secret encryption key is required to decrypt the message, the method steps comprising:

splitting the secret encryption key into at least two partial keys such that knowledge of a first of the partial keys reduces but does not eliminate the work factor required to break the encrypted message;

calculating a hash of at least part of the secret encryption key in combination with a salt;

encrypting at least the hash in combination with the first partial key using a public key of the authorized entity; and providing the encrypted first partial key together with the encrypted message thereby enabling the authorized entity to determine the first partial key and to break the encrypted message using the first partial key.

16. A computer usable medium having computer readable program code means embodied in said medium for causing said computer to perform method steps for decrypting an encrypted message received in a differential work factor cryptographic system in which the message is encrypted using a secret encryption key, a partial key of the secret encryption key is encrypted in combination with a hash of at least the secret encryption key and a salt using a public key of an authority, and the encrypted partial key is transmitted with the encrypted message, the method steps comprising:

determining whether the encrypted partial key is received with the encrypted message and is valid by generating a hash of at least the secret encryption key and the salt, encrypting the hashed at least secret encryption key and salt in combination with the partial key using the public key of the authority, and comparing the encrypted hashed at least secret encryption key and partial key with the encrypted partial key received with the encrypted message;

if the encrypted partial key is not received with the encrypted message or is not valid, refusing to decrypt the encrypted message; and if the encrypted partial key is received with the encrypted message and is valid, decrypting the message using the secret encryption key.

17. A method for providing an authorized entity with at least part of a secret encryption key used to encrypt a message transmitted to an intended recipient, the method comprising:

encrypting the at least part of the secret encryption key in combination with a hash of at least part of the secret encryption key and a salt such that the authorized entity can decrypt the at least part of the secret encryption key; and transmitting the encrypted at least part of the secret encryption key with the encrypted message.

18. The method of claim 17 further comprising:

determining, upon receipt by the intended recipient of the encrypted message, whether the encrypted at least part of the secret encryption key is transmitted with the encrypted message and is valid; and refusing to decrypt the encrypted message if the encrypted at least part of the secret encryption key is not transmitted with the encrypted message or is not valid.

19. The method of claim 17 wherein the step of encrypting the at least part of the secret encryption key comprises encrypting the entire secret encryption key.

20. The method of claim 17 wherein the step of encrypting comprises encrypting the at least part of the secret encryption key in combination with a hash of the entire secret encryption key and the salt.

21. A method for reducing but not eliminating the work factor required by an authorized entity to break an encrypted message, which encrypted message requires a secret encryption key to decrypt the message, the method comprising:

splitting the secret encryption key into at least two partial keys such that knowledge of a first of the partial keys reduces but does not eliminate the work factor required to break the encrypted message;

calculating a hash of the secret encryption key in combination with a salt;

encrypting the hash in combination with the first partial key and all or part of the salt using a public key of the authorized entity;

encrypting the secret encryption key in combination with the salt using a public key of an intended recipient of the encrypted message; and providing the encrypted first partial key and encrypted secret key together with the encrypted message.

* * * * *